(No Model.)
J. B. FIELD.
MOISTENING OLEAGINOUS SEEDS AND MEAL FOR EXTRACTING THE OIL THEREFROM.
No. 260,182. Patented June 27, 1882.
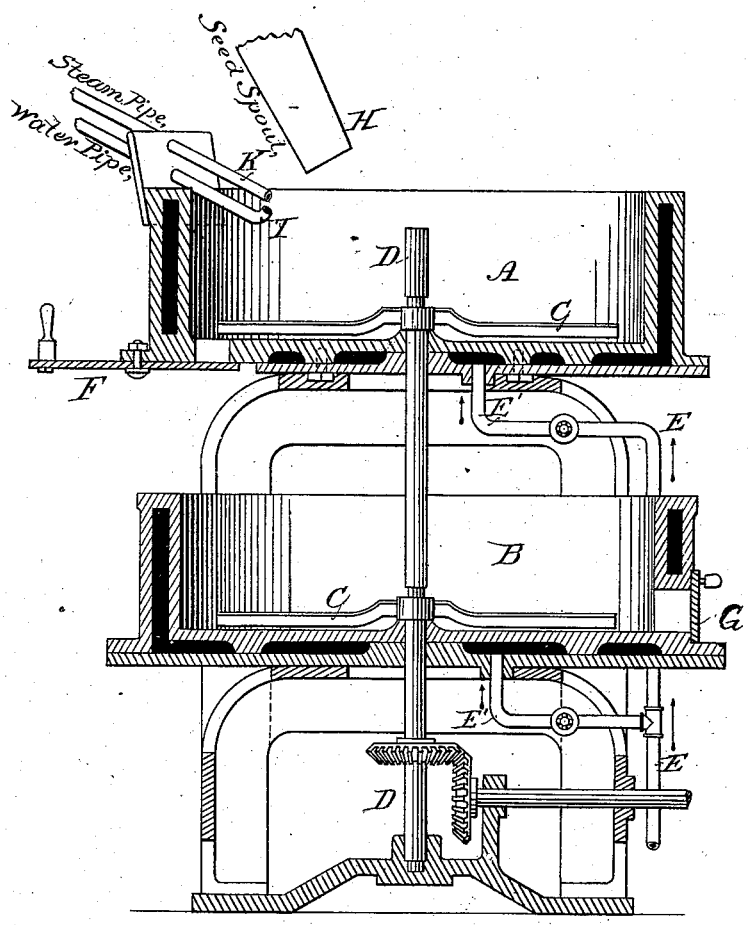
WITNESSES
Ernest Abshagen
Philip Mauro
INVENTOR
Joseph B. Field
By his Attorney
A. Pollok

UNITED STATES PATENT OFFICE.

JOSEPH B. FIELD, OF OTTUMWA, IOWA, ASSIGNOR TO WILLIAM DAGGETT AND WILLIAM T. HARPER, OF SAME PLACE.

MOISTENING OLEAGINOUS SEEDS AND MEAL FOR EXTRACTING THE OIL THEREFROM.

SPECIFICATION forming part of Letters Patent No. 260,182, dated June 27, 1882.

Application filed February 13, 1882. (No model.)

*To all whom it may concern:*

Be it known that I, JOSEPH B. FIELD, of Ottumwa, in the county of Wapello and State of Iowa, have invented a new and useful Improvement in Moistening Oleaginous Seeds and Meal for Extracting the Oil Therefrom, which improvement is fully set forth in the following specification.

This invention relates more particularly to the moistening of linseed and other seed after grinding and preparatory to expressing the oil therefrom.

Heretofore the grinding has commonly been done either by the action of crushing-rollers followed by edge-runners or by the successive action of several pairs of crushing and grinding rolls arranged vertically in a frame like calender-rolls, and the moistening has been effected in two principal ways—to wit, by throwing water on the seed while under the edge-runners, or by injection of steam or water into the ground seed in a jacketed tempering-vessel through a perforated stirrer, into which vessel the seed is delivered from the crushing and grinding rolls, or it may be from the edge-runners.

The present invention is designed as an improvement on these methods of moistening the seed; and it consists in spraying the water thereon, preferably as it flows from a spout into a jacketed tempering-vessel, and also in an apparatus for the purpose. The water is preferably sprayed upon the seed by a jet of steam or compressed air acting across the end of a water-pipe, although other means may, under the present invention, be used for the purpose—as, for example, a fine rose through which the water is forced under pressure.

The following description will enable those skilled in the art to make the invention, reference being had to the the accompanying drawing, which forms a part of this specification, and which represents in vertical section an apparatus for moistening ground linseed and other seed in accordance with the invention.

Upon a suitable frame are supported two jacketed vessels or double water-kettles, A B, one above the other, and each provided with one or more stirrer-arms, C, fastened to and revolving with an upright central shaft, D, to which motion is imparted by suitable gearing.

The vessels A B are heated to about 160° Fahrenheit, by steam or other heating medium circulating through the jackets of these vessels, being supplied thereto by means of pipes, of which one, E, is shown communicating with the jackets by branches E'. The upper vessel, A, has an opening in the bottom closed by a gate, F. The lower vessel, B, has an opening for drawing off at the side the moistened and tempered seed, the said opening being closed by a gate or valve, G.

The ground linseed or other seed from the crushing and grinding rollers, or it may be from edge-runners or other suitable grinding mechanism, is delivered into the upper vessel through the spout H. As it leaves the spout it meets a spray of water from the water-pipe I. This pipe is supported in any suitable way and is combined with a steam-pipe, K, the two being so arranged that a jet of steam issuing from the pipe K makes a spray of the water issuing from pipe I and forces it among the seed, equally moistening the whole. As shown, the end of the pipe I is turned up at L, and the steam-jet passes over the upturned end, as in well-known forms of atomizers.

Instead of passing steam through the pipe I, compressed air or other gas or even water under pressure could be introduced.

The seed is stirred in vessel A by the stirrer C, and, being sufficiently moistened, passes through the opening controlled by gate F into the vessel B, when the tempering is completed. The moistened and tempered seed is drawn off as required for pressing by raising gate G.

It is obvious that modifications can be made in the details of the process and apparatus without departing from the spirit of the invention.

Instead of producing the spray by a jet of fluid under pressure, a wheel with buckets for striking and thus throwing into spray a stream of water could be used, or an apparatus on the principle of Barker's centrifugal mill.

The apparatus described could be used for moistening material other than seed.

I claim—

1. The method of moistening ground linseed and other seed preparatory to expressing the oil by fine spray of water, substantially as described.

2. The method of moistening ground linseed and other seed preparatory to expressing the oil by spraying water on a stream of the seed flowing from a spout, substantially as described.

3. An apparatus, substantially as described, comprising, in combination, means for producing a fine spray of water and means for exposing to said spray the seed to be moistened.

4. The combination of the feed-spout and devices for spraying water, substantially as described.

5. The combination of the tempering vessels or kettles, the seed-spout, and devices for spraying water, substantially as described.

In testimony whereof I have signed this specification in the presence of two subscribing witnesses.

J. B. FIELD.

Witnesses:
CHAS. F. BLAKE,
J. W. EDGERLY.